United States Patent [19]

Swank

[11] Patent Number: 4,967,987
[45] Date of Patent: Nov. 6, 1990

[54] CABLE MOUNTING SYSTEM

[75] Inventor: David T. Swank, Millersburg, Ohio

[73] Assignee: The Fluorocarbon Company, Laguna Niguel, Calif.

[21] Appl. No.: 168,187

[22] Filed: Mar. 15, 1988

[51] Int. Cl.$^5$ .............................................. F16L 3/00
[52] U.S. Cl. ..................................... 248/68.1; 248/56
[58] Field of Search ................. 248/56, 74.4, 67.5, 248/68.1, 74.1; 74/502.6, 502.4, 502.5

[56] References Cited

U.S. PATENT DOCUMENTS

| | | | |
|---|---|---|---|
| 2,542,442 | 2/1951 | Weber | 248/68.1 |
| 2,613,900 | 10/1952 | Byrnie | 248/68.1 |
| 2,944,781 | 7/1960 | Masters | 248/72 X |
| 3,121,772 | 2/1964 | Zurweile | 248/68.1 X |
| 3,920,887 | 11/1975 | Kloos et al. | 248/68.1 X |
| 4,294,133 | 10/1981 | Hurley | 74/502.4 |
| 4,339,213 | 7/1982 | Gilmore | 248/74.1 X |
| 4,346,863 | 8/1982 | Zeiträger et al. | 248/56 X |
| 4,601,448 | 7/1986 | Miyazaki et al. | 248/56 |
| 4,714,219 | 12/1987 | Mayse | 248/65 |
| 4,739,596 | 4/1988 | Cunningham et al. | 248/56 X |

OTHER PUBLICATIONS

P. 41 of Felsted Cable and Control Systems Technical Manual.
Cover Page of Accelerator Control Systems by Morse Controls.

Primary Examiner—Karen J. Chotkowski
Attorney, Agent, or Firm—Fay, Sharpe, Beall, Fagan, Minnich & McKee

[57] ABSTRACT

One leg of an angled mounting bracket is formed with an access hole sufficiently large to insert an end of a cable assembly through the hole, the assembly including a cable, a flexible conduit slidably receiving the cable, a tubular fitting fixed to the cable and a boot on one end of the conduit. A plurality of slots extend outwardly from the access hole to provide somewhat of a keyhole configuration. Each slot is sized to receive the conduit fitting of the cable assembly. A single lock plate slides across the access hole in a manner to cause edges of the lock plate to engage the cable assembly fittings and rigidly hold them in a fixed position. Retainer portions on the plate and the bracket hold the plate in face-to-face contact with the bracket.

21 Claims, 4 Drawing Sheets

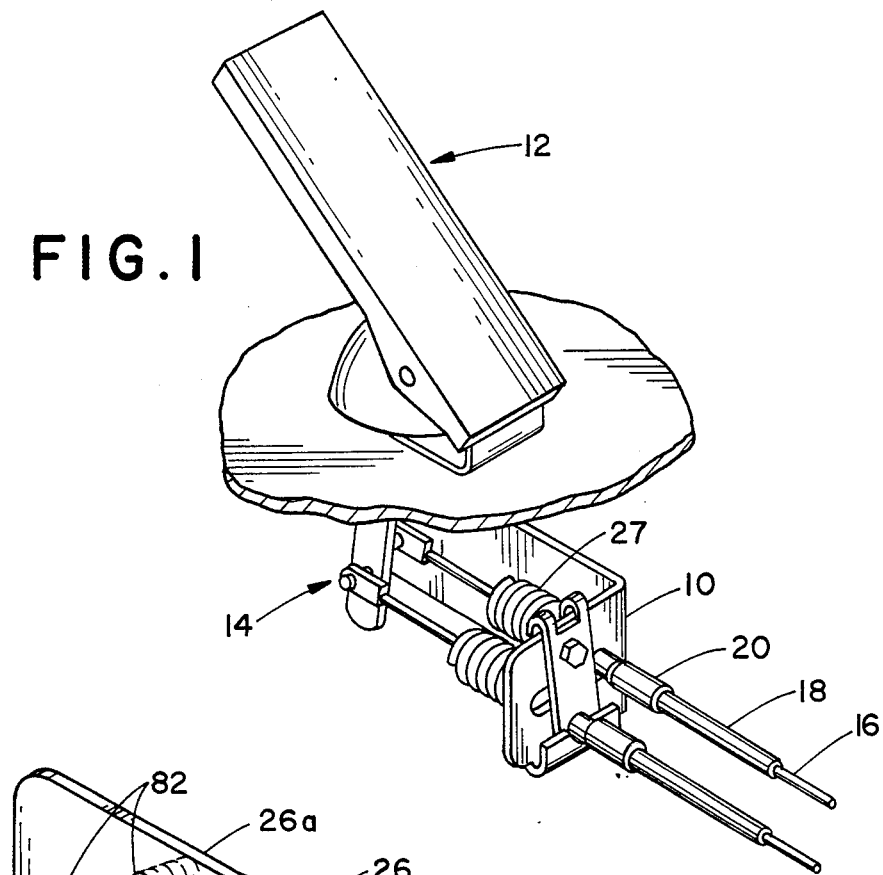
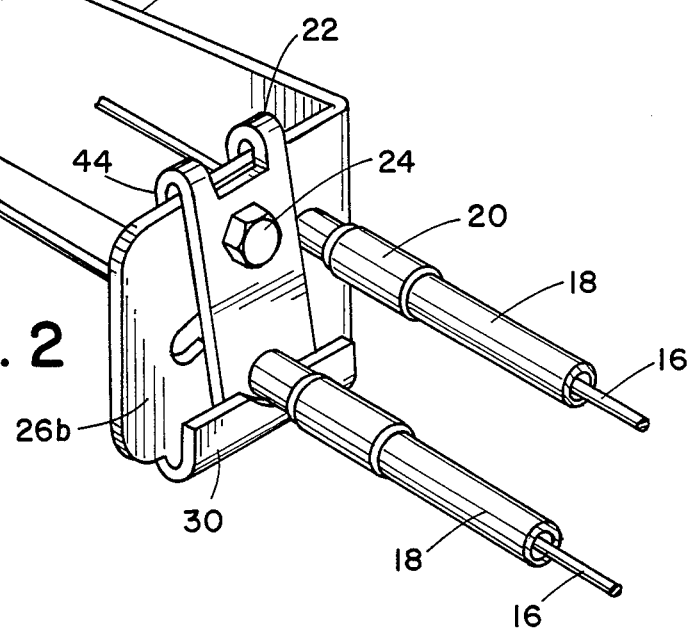

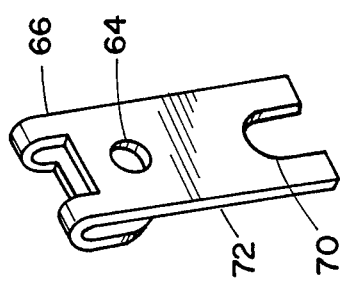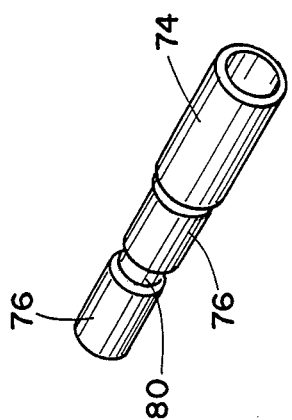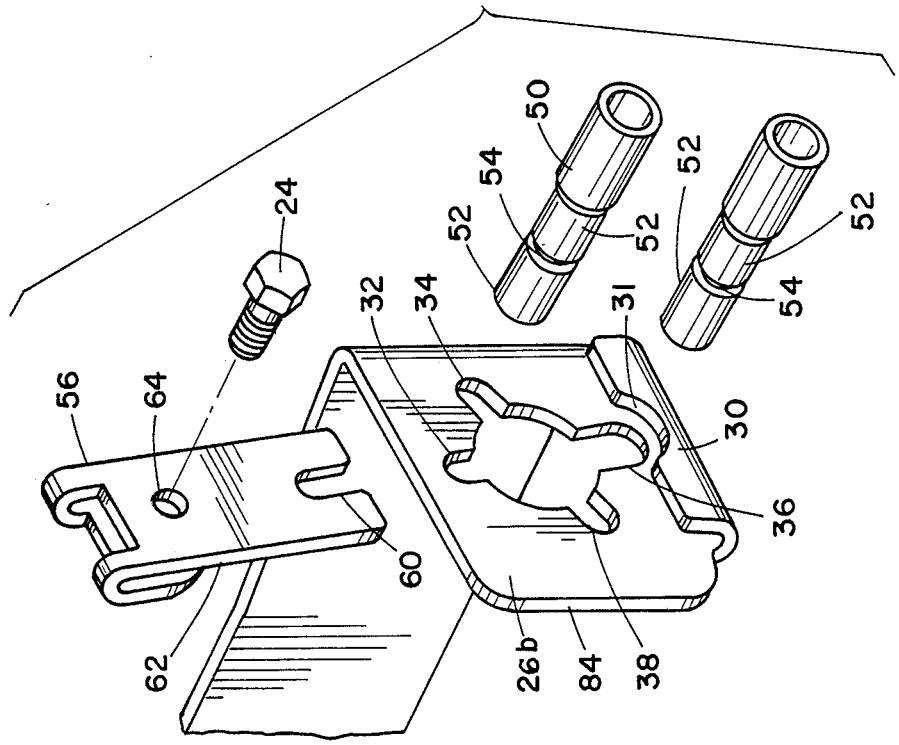

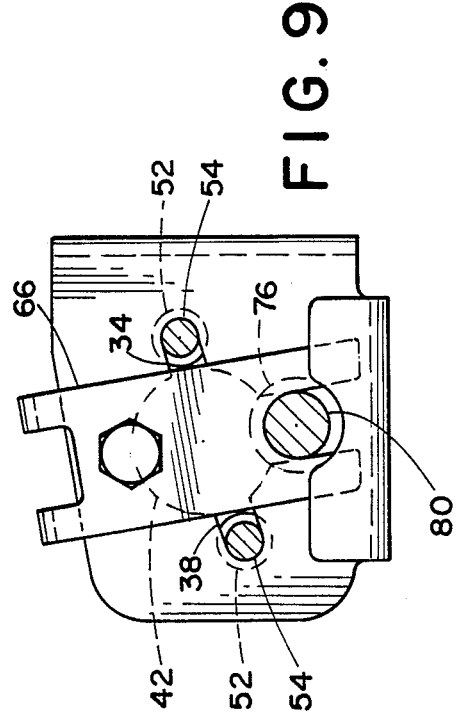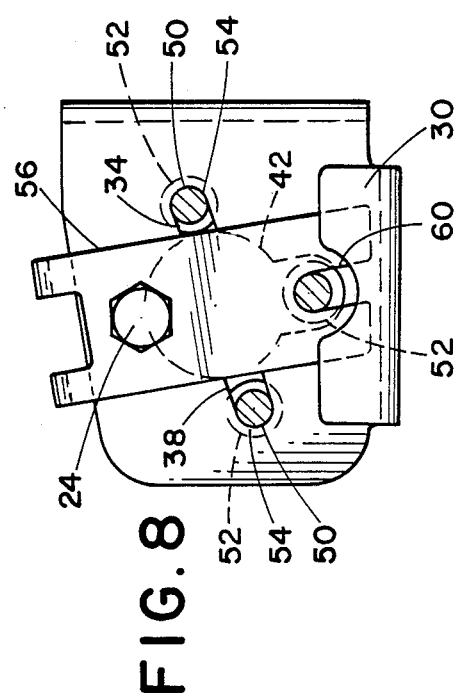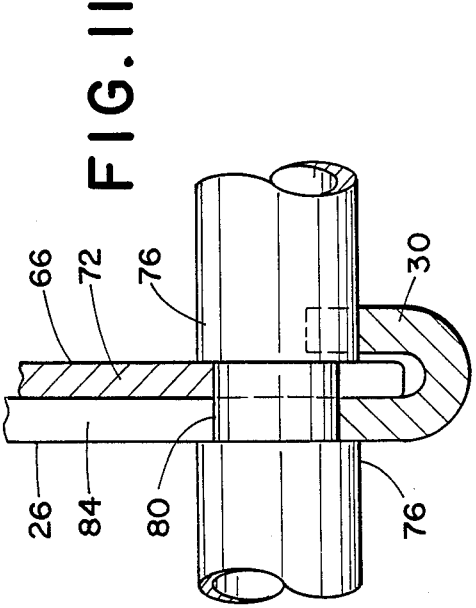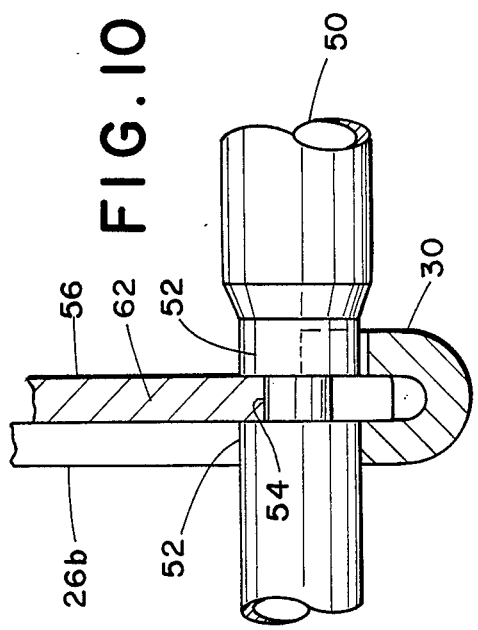

CABLE MOUNTING SYSTEM

BACKGROUND OF THE INVENTION

1. Field of the Invention

This invention is generally related to cable control systems wherein it is required that the cable conduits be rigidly affixed with respect to the frame or body upon which the cables act. In particular, this invention is related to systems which can accommodate the mounting of multiple cable conduits to a common mounting bracket, with the conduits, housing cables subjected to varying tensions.

2. Description of Prior Art

Cable control systems permit the mechanical linkage of operating controls to the operating machinery. The flexibility and durability of cable systems represents substantial advantages over the use of rigid mechanical linkages. In order for the advantages of cable systems to be realized, the cable conduits in which the cables slide must be rigidly affixed at certain positions along the length of the cable conduit. If the cable conduits are not rigidly fixed, the cable activation will be inaccurate and inefficient.

Traditionally, each control lever manipulated by the operator actuated a single cable. In these traditional systems, each cable conduit was fixed by an individual means. These means included U-bolts, strap-type clamps and crimping by means of a conduit clip.

However, as control systems advanced, it became necessary for multiple cables of varying tensions and diameters to be commonly controlled, or activated by proximate controls. These multiple cable conduits were originally fixed by the traditional one fastener per cable means. In addition to extending the prior means of securing cable conduits, stacked molded blocks were used to secure multiple cable conduits to the frame.

Because these systems of attachment were labor and inventory intensive, they are expensive. The time to install these securing means and the bulk of such attachments militates the advantages offered by cable control systems. Also, the known systems involve small components and multiple fasteners, which adds to installation time particularly if such elements must be installed from an awkward location such as under a vehicle.

There is a need for a labor and inventory efficient method for the common mounting of multiple cable conduits.

SUMMARY OF THE INVENTION

The present invention provides for the mounting of one or more cable conduits to a common bracket by means of a single lock plate fastened to the bracket. The cable hanger bracket incorporates a central access hole sufficiently large to receive a cable assembly including a cable conduit slidably supporting the cable, a fitting on the conduit, and an attached larger diameter boot. Extending outwardly from the central access hole are slots sized to slidably receive cable conduit fittings.

The lock plate is positioned across the central access hole to contact the edge of a cable conduit fitting received in any of the slots.

The cable conduit fittings are grooved so as to engage either the cable hanger bracket or the lock plate. When the lock plate is rigidly fixed to the cable hanger bracket, the engaged cable conduit fittings are rigidly fixed with respect to the common bracket and the cable conduits connected to the fittings are thereby also at that point, such cables act more accurately.

An advantage of the present invention lies in the limited number of required parts required to mount multiple cables of various diameters under various tensions to a common bracket without requiring an increase in the number of parts, or fastening connections required. The requirement of a single fastening connection provides for the very quick and labor-efficient installation of the mounting system of the invention. The necessary number of parts is independent of the number of cable conduits to be attached or the tensions to which the cable conduits are subjected.

BRIEF DESCRIPTION OF THE DRAWINGS

FIG. 1 is a view of the mounting system of the present invention in a schematically illustrated environment.

FIG. 2 is an enlarged perspective view of the mounting system.

FIG. 5 is an exploded perspective view of one size lock plate, with one size cable conduit fittings, the cable hanger bracket and a fastener.

FIG. 6 is a perspective of a different size lock plate.

FIG. 7 is a perspective view of different size cable conduit fitting;

FIG. 8 is an elevational view of the lock plate of FIG. 5 engaging three cable conduit fittings of one size in the cable hanger bracket.

FIG. 9 is an elevational view of a the lock plate of FIG. 6 engaging a cable conduit fitting of one size and two smaller cable conduit fittings.

FIG. 10 is a cross-sectional side view of the lock plate of FIG. 8 engaging a cable conduit fitting in the cable hanger bracket.

FIG. 11 is a side view of the lock plate of FIG. 6 engaging a cable conduit fitting in the cable hanger bracket.

DESCRIPTION OF PREFERRED EMBODIMENTS OF THE INVENTION

Figure 4:
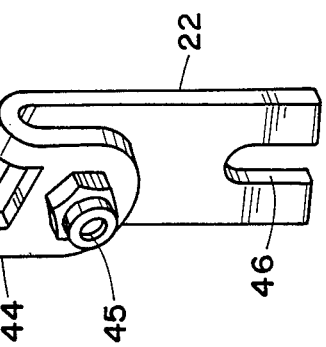
FIG. 4 is a perspective view of the lock plate.

Referring to FIG. 1, a cable mounting system 10 is shown in its operating environment. Operator control 12, illustrated, for example, as an accelerator pedal for a vehicle, is mechanically linked by a schematically shown linkage mechanism 14 to a plurality of cable assemblies including cables 16 slidably mounted in flexible conduits 18. The cables are to be connected to components to be controlled. In one example one of the cables is used to control the fuel throttle of an engine, and the other is used to control a transmission modulator. The amount of cable travel is determined by the connection in the linkage mechanism. The cables 16 from the linkage mechanism 14 pass through the cable mounting system 10 to which tubular cable conduit fittings 20 are rigidly attached. Such an attachment is required in order for the cables to accurately translate movement between the control 12 and the machine component on which the cable acts. A flexible boot 27 extends from the end of the fitting 20 to the linkage mechanism 14 to shield the end of the cable.

Referring to FIG. 2 as well as FIG. 1, a feature of the invention is that the simplified cable mounting system employs only three components. This includes a cable hanger bracket 26, a lock plate 22 and a fastener 24. Once the bracket is mounted, the cable installer need only handle the lock plate and the fastener in addition to the cable assembly.

As may be seen, the bracket 26 has an angular configuration including a flat main leg 26a supporting a pair of mounting studs 82 for mounting the bracket to a vehicle. The bracket 26 further includes a shorter leg 26b that extends perpendicular to the leg 26a. The leg 26b primarily has a flat, plate-like configuration; however, the lower portion is bent upwardly forming a stub wall 30, such that the lower end of the bracket leg 26b has a U shape which is adapted to receive the lower end of the lock plate 22, thus forming a retainer. Channel shape at 30 also provides added strength to the lower edge of the leg 26b which has small edge distance with slot 36.

Figure 3:
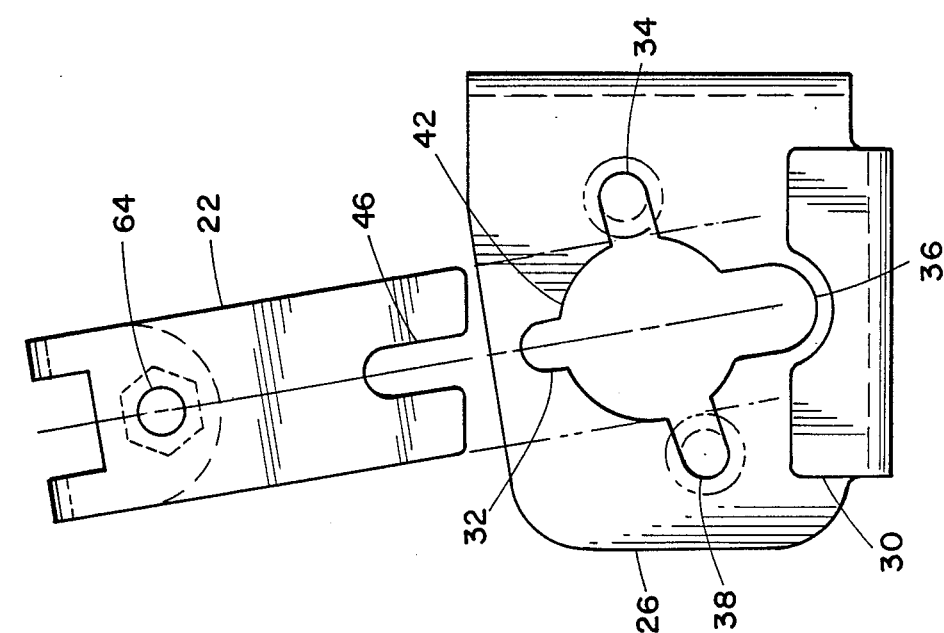
FIG. 3 is an exploded elevational view of the lock plate and hanger bracket illustrating the manner of engagement.

Referring to FIG. 3, the preferred form of the cable hanger bracket has a circular, central access hole 42 in its leg 26b. The hole is large enough to receive a cable conduit fitting 20 as well as the larger diameter flexible boot 27 in FIG. 1. Extending outwardly from the central access hole 42 is a plurality of circumferentially spaced, outwardly extending slots 32, 34, 36, 38. Preferably, the slots extend generally radially with respect to the hole 42. The slot 32 opens from the upper portion of the hole 42 and is sized to receive the fastener 24. The slots 34, 38 are located on each side of the slot 32 and are adapted to slidably receive a cable conduit fitting of a certain size. The slot 36 which opens off of the lower portion of the hole 42, is also adapted to receive a cable conduit fitting. However, its diameter is slightly larger than that of the slots 34, 38.

The lock plate 22 has a main portion with a substantially flat rectangular shape. The upper end of the plate is doubled on itself to form a depending stub wall 44 which extends parallel to the main plate, thus giving the upper portion a downwardly opening, U-shaped cross section. The space between the wall 44 and the main plate is adapted to fit onto the bracket leg 26b, thus forming a retainer. Similarly, the lower end of the lock plate 22 is adapted to fit within the U-shaped retainer on the lower end of the bracket leg 26b, as seen in FIGS. 1 and 2. The width of the lock plate is about equal to the diameter of the access hole 42, and the height of the plate is about equal to the height of the bracket leg 26b.

The lower end of the lock plate has a centrally located, generally vertically extending slot 46, FIG. 4, which opens to the end of the plate and is adapted to slidably receive a conduit fitting 20. An aperture 64 is formed in the upper portion of the lock plate, aligned with a similar aperture in the lock plate stub wall 44. A threaded nut 45 is attached to the exterior side of the stub wall 44, aligned with the aperture 64. The aperture in the nut 45 is adapted to receive the fastener 24 to hold the lock plate to the mounting bracket.

In a general sense, it may be seen from FIGS. 2 and 3 that one or more cable assemblies including cables 16, together with conduits 18, fittings 20, and boots 27 may be inserted into the central hole 42, and the fittings 20 are slid within one of the slots 34, 36 or 38. These fittings are then locked in that position by simply sliding the lock plate across the bracket into the position shown in FIG. 2. The interference fit between U-shaped portions of the bracket and lock plate holds the lock plate in place and thus like fittings, connection is made more rigid by securing the lock plate in that position by means of the fastener 24.

There are cable assemblies of different sizes commonly used. The mounting system of the invention can be designed to accommodate conduit fittings of various sizes, and more than one size can be secured by a particular mounting bracket. The drawings illustrate two sizes of cable conduit fittings 20, one which is referred to as a 3-series cable having a conduit fitting 50 as shown in FIG. 5, and 4-series cable having a larger diameter conduit fitting 74 illustrated in FIG. 7. The multiple mounting system disclosed contemplates the use of two different lock plates, including the lock plate 56 of FIGS. 5, 8 and 10, and the lock plate 66 of FIGS. 6, 9 and 11. The lock plates are essentially the same, except that the 3-series lock plate 56 is thicker than the 4-series lock plate 66, and the lock plate slot 60 in plate 56 is smaller than the slot 70 in the plate 66.

Referring to FIG. 5, the 3-series cable conduit fitting 50 has 3-series cable conduit fitting channel or groove 54 which is bounded by a larger diameter hub 52. The axial width of the groove 54 is slightly greater than the thickness of the bracket leg 26b so that the leg can fit snugly within the groove. The diameter of the fitting in the area of the groove 54 is slightly smaller than the diameter of the slots 34, 38 in the bracket. This can be seen in FIG. 8 wherein two of the fittings 50 are shown positioned in the slots 34, 38.

The groove 54 in the smaller fitting 50 is also approximately equal to the thickness of the lock plate 56 such that the lock plate will slidably fit within that groove. The diameter of the fitting hub 52 is slightly smaller than the diameter of the slot 36 in the bracket such that the fitting hub 52 may be slidably received in that slot. Such an arrangement is illustrated in FIG. 10, wherein the hub 52 of the smaller fitting 50 is shown positioned within the slot 36 of the bracket, while the plate 56 is shown positioned in the groove 54. Also, the lower end of the plate 56 is captured by the U-shaped lower end of the bracket leg 26b. Likewise, the U-shaped portion on the upper end of the plate 56 has slidably fit onto the upper edge of the bracket leg 26b. The fastener 24, which extends through the aperture 64 in the lock plate 56, through the slot 32 in the bracket and threads into the nut 45 on the lock plate, clamps the lock plate in the position shown in FIG. 10.

This arrangement securely and rigidly locks each of the cable fittings in all directions. That is, the fittings in the side bracket slots 34 and 38 are prevented from lateral movement by the edges of the bracket slots in all directions except for the direction opening into the central hole in the plate, and the side edge of the lock plate prevents movement in that direction by engaging the exterior of the fitting hub. Axial movement of the fittings is prevented by the bracket leg 26b being within the grooves 54 in the fittings. The fitting in the lower slot is prevented from lateral movement by the slot edges 36 in three directions, and the lock plate prevents lateral movement in the upper, fourth direction.

When a 4-series cable conduit fitting 74, that is the larger one, is inserted into bracket slot 36, the diameter of the fitting groove 80 is such that it is snugly received in the slot 36, as can be seen from FIG. 9. Also, there is a circular recess 31 in the upper edge of the bracket stub wall 30 which engages the fitting hub 76 to further stabilize the connection and prevent lateral movement, as seen in FIG. 11. This fixes the fitting in three lateral directions, but it can still move axially a limited amount since the axial width of the groove 80 is greater than the thickness of the bracket leg 26b. To prevent this further movement, the lock plate 66 is slid into the position shown in FIGS. 9 and 11. The slot 70 on the lower end of the plate is just large enough to receive the diameter of the fitting groove 80, but it is smaller than the hub 76 such that the plate assists in preventing sideways lateral movement, and also prevents vertical movement of the fitting. In addition, the plate is sufficiently thin such that it fits within the fitting groove 80 with the bracket leg 26b. The combined thickness of those two components prevents axial movement of the fitting. As with the arrangement of FIGS. 5 and 8, the threaded fastener is employed to hold the lock plate in position with respect to the bracket. Thus, it is rigidly mounted in a manner that prevents movement in any direction.

As noted from FIG. 9, the width of the lock plate 66 is the same as the width of the plate 56 such that the plate 66 holds two of the fittings 50 in position in the bracket slots 34, 38 in the same manner as illustrated in FIG. 8 in connection with the plate 56. Of course, the bracket 66 can be used simply for holding one of the larger fittings 74, as illustrated, or with only one of the smaller fittings 50. Similarly, the lock plate 56 can be used to hold one, two or three of the smaller fittings 50, as shown in FIG. 8.

Thus, with the arrangements illustrated an installer can mount or dismount cable assemblies in a quick and easy manner in contrast to the prior systems involving more components.

What is claimed is:

1. A cable mounting system for the mounting of one or more cable conduits to a common bracket, comprising:
   a cable hanger bracket having a large access hole though which a cable conduit can be inserted, one or more slots extending outwardly from the hole to receive and position a cable conduit fitting, and a fastening aperture; and
   a lock plate adapted to extend across said hole and being formed to engage said bracket, said lock plate having an edge adapted to engage a cable conduit fitting mounted in one of said slots to prevent movement of said fitting out of the slots and a fastening aperture, wherein said fastening aperture in said bracket and said fastening aperture in said lock plate are coaxially aligned when said lock plate is in an engaged orientation with the bracket, thus allowing said cable conduit fitting to be held in position.

2. The system of claim 1, wherein said lock plate has a thickness sized to fit within a groove on said fitting to prevent axial movement of the fitting.

3. The system of claim 1, wherein a thickness of said bracket, in combination with a thickness of said lock plate, is such that the bracket and the lock plate will fit snugly within a groove on said fitting to prevent axial movement of the fitting.

4. The system of claim 1, including a retainer portion on said bracket adapted to slidably receive an edge of said lock plate, and a retainer portion on said lock plate for slidably receiving said bracket, whereby said lock plate and said bracket are held in face-to-face engagement.

5. The system of claim 1, wherein said bracket has two of said slots spaced circumferentially from each other at a location coordinated with the lock plate such that a first edge of said lock plate is adapted to engage one fitting to hold that fitting in a slot, and a second edge of said plate is adapted to engage another fitting to hold it in a slot.

6. The system of claim 5, wherein said bracket includes a third slot spaced circumferentially from said two slots and wherein said lock plate has a third edge adapted to engage a fitting positioned in said third slot when the first and second edges are engaging fittings in said two slots.

7. The system of claim 6, wherein said bracket has a fourth slot opening to said central access hole for receiving a fastener to restrict edgewise movement of said lock plate with respect to said bracket.

8. The system of claim 1, wherein said bracket has a U-shaped retainer portion adapted to receive an end of said lock plate, and said lock plate has a U-shaped retainer portion adapted to fit vents onto an edge of said bracket, thereby holding the bracket and the plate in face-to-face engagement.

9. The system of claim 1, wherein said lock plate includes a slot in one edge for slidably fitting within a groove in one of said fittings to hold said fitting in engagement with said bracket.

10. The system of claim 1, wherein said lock plate has a U-shaped portion on one end adapted to receive one edge of said bracket, and a slot on an opposite end adapted to fit within a groove in one of said fittings.

11. The system of claim 1, wherein the width of said lock plate is about the width of said access hole such that the plate includes side edges that are adapted to engage cable fittings positioned in side slots open to said hole to hold said fittings in said side slots.

12. The system of claim 1, wherein said lock plate includes a slot on one end adapted to engage a hub portion of one of said fittings to restrict lateral movement of the fitting.

13. The system of claim 1, including three of said slots, wherein two of the slots are of the same size, and the third slot has a diameter larger than that of said two slots and is adapted to receive a slotted portion of a larger diameter fitting, or a hub portion of a fitting of the size which fits within said two slots, and said lock plate has edges for engaging a hub portion of three of the smaller fittings.

14. The system of claim 13, wherein said lock plate has edges adapted to engage hub portions of said smaller fittings and an edge adapted to engage a slotted portion of one of said larger fittings.

15. A cable mounting system for the mounting of one or more cable conduits, comprising a cable hanger bracket having a plate-like portion with an access hole sufficiently large to receive a cable assembly, including a cable conduit, a cable slidably positioned within the conduit, a fitting fixed to said conduit and a boot surrounding a portion of said conduit, said bracket including a slot extending outwardly from said hole, with the slot being open on one end to said hole to permit the lateral insertion of said fitting into said slot, said slot being sized to snugly receive said fitting so as to restrict lateral movement of the fitting wherein said bracket further includes at least two circumferentially spaced slots whereby at least two of said fittings may be captured within said bracket.

16. The system of claim 15, wherein said slot is sized to receive a grooved portion of said fitting to restrict axial movement of said fitting and said conduit.

17. The system of claim 15, wherein said bracket includes a U-shaped retainer portion on one edge adapted to receive an edge of a lock plate which cooperates with said slots to restrict movement of said fittings.

18. The system of claim 17, wherein said retainer portion includes a stub wall which extends generally parallel to the main plate-like portion of said bracket, said stub wall includes a recess in its free end which is coaxial with one of said slots and is adapted to engage the periphery of the fitting which is positioned in said one slot.

19. The system of claim 15, wherein said bracket has a generally angular configuration with said plate-like portion forming one leg of the bracket, and a second leg of the bracket is adapted to be mounted to a supporting structure.

20. In a system for mounting cable assemblies of the type including a cable, a flexible conduit in which the cable slides and a tubular mounting fitting fixed to and surrounding said conduit, a locking plate for locking one or more of said cable conduit fittings to a mounting bracket, said plate having an end edge with a slot formed therein that opens to said edge, said slot being sized to receive and position said fitting and restrict movement of the fitting transverse to the axis of the fitting, said plate having a U-shaped retainer portion on an end opposite from said slot, with said retainer portion being adapted to slide onto and extend over an edge of said mounting bracket to hold the plate in face-to-face engagement with said bracket, said plate also having a first edge adapted to lock a fitting in a first slot formed in said bracket, wherein said bracket includes a second slot spaced circumferentially from said first slot and wherein said locking plate has a second edge adapted to engage a fitting positioned in said second slot when the first edge is engaging a fitting positioned in said first slot.

21. A cable mounting system for the mounting of one or more cable conduits to a common bracket, comprising:
a cable hanger bracket having a large access hole through which a cable conduit can be inserted, and one or more slots extending radially outwardly from the hole to receive and position a cable conduit fitting; and,
a lock plate adapted to extend across said hole and formed so as to engage said bracket, said lock plate having a first edge adapted to engage a first cable conduit fitting mounted in one of said slots to prevent movement of said first fitting out of said one slot and a slot formed in one end edge of said lock plate and adapted to fit within a groove in a second cable conduit fitting, including a fastening aperture in said bracket and a fastening aperture in said lock plate coaxially aligned with the bracket fastening aperture when said lock plate is in an engage orientation with the bracket, thereby allowing said fittings to be held in position.

* * * * *